United States Patent [19]

Hommel

[11] Patent Number: 5,697,166
[45] Date of Patent: Dec. 16, 1997

[54] MEASURING ACCESSORY FOR ADJUSTABLE WRENCH

[76] Inventor: Scott David Hommel, P.O. Box 7361, Auburn, Calif. 95604-7361

[21] Appl. No.: 529,633

[22] Filed: Sep. 15, 1995

[51] Int. Cl.$^6$ .................. G01B 3/10; B25F 1/00
[52] U.S. Cl. ............................... 33/758; 7/164
[58] Field of Search ............... 33/758, 483, 493; 7/139, 142, 163, 164, 150

[56] References Cited

U.S. PATENT DOCUMENTS

| | | |
|---|---|---|
| 1,846,380 | 2/1932 | Anderson . |
| 2,596,266 | 5/1952 | McEnroe, Jr. . |
| 2,722,150 | 11/1955 | Green . |
| 2,742,705 | 4/1956 | Gelardi .................. 33/758 |
| 2,932,897 | 4/1960 | Huber ..................... 33/758 |
| 3,183,744 | 5/1965 | Bowman . |
| 3,330,709 | 7/1967 | Zelnick . |
| 3,470,574 | 10/1969 | Heitman . |
| 3,948,120 | 4/1976 | Hancock . |
| 4,028,970 | 6/1977 | Pelczar . |
| 4,063,444 | 12/1977 | Vecho, Jr. ................ 33/758 |
| 4,122,569 | 10/1978 | Hitchcock ................ 7/142 |
| 4,326,436 | 4/1982 | McGraw . |

FOREIGN PATENT DOCUMENTS 1226055   3/1971   United Kingdom ............ 33/758

OTHER PUBLICATIONS

BAHCO—advertisement published on or before Apr. 1994.

Primary Examiner—Thomas B. Will
Attorney, Agent, or Firm—Joseph E. Gerber

[57] ABSTRACT

An accessory for enabling an adjustable wrench to function as a measuring device is disclosed, the accessory comprising a planar, flexible, durable, adhesive-backed, L-shaped member having a short base leg and an integral elongate measuring leg bearing length-indicating indicia. The L-shaped member is adapted to be disposed upon an adjustable wrench such that the base leg is affixed to a side face of the wrench's fixed jaw and the measuring leg is affixed to the track in which the wrench's movable jaw travels. A supplemental reference member including a reference mark is disposed upon the movable jaw. A kit comprised of an L-shaped member and a reference member or, alternatively, a pair of mirror-image L-shaped members marked with different dimensional units, along with a pair of supplemental reference members, is also disclosed.

19 Claims, 2 Drawing Sheets

MEASURING ACCESSORY FOR ADJUSTABLE WRENCH

BACKGROUND OF THE INVENTION

1. Field Of The Invention

The present invention relates generally to hand tools, and more specifically to an accessory for addition to such opposed-jawed tools as adjustable wrenches, and the like.

2. Description Of The Related Art

The hand tool now commonly referred to as an adjustable wrench is generally comprised of a handle with a fixed jaw, and a worm-actuated, opposing movable jaw. Overall, the adjustable wrench is one of the most ubiquitous hand tools; and, it is the most versatile wrench in a mechanic's tool box. Even the least handy person is likely to find the common adjustable wrench as indispensable as any of the other three tools (a hammer, a screwdriver, and a pair of pliers) in the most basic home tool set.

Early on in the development of the shape and structure of the adjustable wrench so familiar today, inventors noticed that the tool was much more useful and versatile when a measuring scale was painted, molded, stamped, etched or engraved on its jaws.

For example, Anderson, in U.S. Pat. No. 1,846,380 issued in 1932 shows an adjustable wrench with just such a measuring scale, as does McEnroe, Jr. in U.S. Pat. No. 2,596,266 issued in 1952. Each employs a single, permanent reference mark on its moveable jaw and a hatched scale on its fixed jaw. Anderson includes a zero on the moveable jaw's reference mark and a zero on the first line of his hatched scale, and these appear to align when the jaws are fully occluded. But, neither Anderson nor McEnroe suggest adding length-indicating numerals or other indicia to the hatched scale. Green, in U.S. Pat. No. 2,772,150 issued in 1955 does so; and, McGraw, in U.S. Pat. No. 4,326,436 issued in 1982, provides English measurements in fractions of an inch on one side of a wrench's jaw, and metric measurements in fractions of centimeters on the other.

Benefits of such measurement-capable adjustable wrenches included being able to set the wrench's jaw width precisely before engaging a nut or bolt. Or, if the size of a bolt, nut or other object were unknown, it could be easily measured by engaging the object with the wrench's jaws, and then reading its measurement from the scale. Such a scale is particularly useful when one is working "blind," i.e. in conditions wherein one can neither see one's own hands, the wrench, nor the object being worked on. Having the ability to set the proper jaw width before-hand, or to read the scale for a needed measurement after the wrench is brought back into view, makes the work much easier.

Despite the advantages of adjustable wrenches having measuring scales, several problems arise in their use, and these problems become especially evident once such wrenches start to age and wear. One is that adjustable wrenches' opposed jaw faces begin to erode with time and use, which causes the measurement scales associated therewith to be less and less accurate. Additional inaccuracies are introduced as a wrench's thumb-driven worm gear, and the gear-engaging rack teeth integral with its moveable jaw, begin to wear. As the tolerances between the worm gear and rack teeth become looser, this permits the moveable jaw to float to and fro enough to introduce significant imprecision into the measurement of the true distance between the wrench's jaws.

Any wear or damage that causes the face of the movable jaw to tilt also jeopardizes accuracy. Such tilt can occur, for example, when the channel in which the rack runs begins to wear. Also, the rack portion of the moveable jaw is vulnerable to being bent if the wrench is used in a manner which puts a great spreading force on its jaws, e.g. as in applying high torque to a nut or bolt. Thereafter, measurements made with the wrench's scale are likely to be inaccurate, because one or both of its jaws could be displaced from the position it was in when the zero point on the scale was calibrated.

Indeed, even a brand new adjustable wrench can be inaccurate from the outset. It would not be surprising to find that the zero line of the hatched measurement scale on the fixed jaw of a lower-priced, lower-quality wrench does not align properly with the moveable jaw's reference mark when the wrench's jaws are fully occluded. And, loose manufacturing tolerances, such as between the worm gear and rack, can result in the same imprecision in measuring ability normally observed after considerable use and wear in a higher quality tool.

Any of the above-described factors: wear, damage or faulty manufacturing, can easily make a difference of 3/16th of an inch, or more, in a measurement taken with an adjustable wrench. Such an error is significant enough to reduce the usefulness of such a wrench considerably.

Quite apart from accuracy problems caused by wear or damage to an adjustable wrench's mechanical parts, wear and damage to the length-indicating hatching, numerals and other indicia of the measurement scale itself can render even a high-precision, high-quality tool practically useless. Painted indicia are particularly vulnerable to being scraped or rubbed off in normal use. Even indicia which are molded, stamped, etched or engraved into a wrench's jaws can be obliterated by scratches or dents; damaged by contact with grinding instruments, rotating wire brushes, and the like; or, obscured by becoming filled with grease, dirt, paint or adhesives.

Accordingly, it would be very advantageous to be able to cure the loss of accuracy in an adjustable wrench's measurement scale as the wrench's mechanical parts, or the scale's indicia, wear during the wrench's normal service life. Further, it would be desirable to permit the purchaser of a new wrench not bearing a measurement scale to add one after purchase, just as it would be desirable for the purchaser of a wrench having inaccurate hatching to cure that inaccuracy.

SUMMARY OF THE INVENTION

The measuring accessory of the present invention, which is suited for use with a conventional adjustable wrench, is adapted to overcome the above-noted shortcomings and to fulfill the stated needs. It comprises a thin, planar, durable, L-shaped member, wherein the L-shaped member includes a base leg and an integral, elongate, measuring leg. The two legs are oriented generally at right angles to one another, the elongate, measuring leg being at least as long as the maximum working distance between the opposing faces of the jaws of the adjustable wrench to which the accessory is to be applied. The elongate leg, further, bears length-indicating indicia. And, the accessory further includes means for affixing the L-shaped member to the surface of a wrench such that the base leg thereof is aligned with and closely adjacent to the edge of the fixed jaw, and such that the elongate, measuring leg extends parallel to the direction of travel of the moveable jaw along its track.

A second member, also thin, planar and durable, is adapted for affixation to the wrench's moveable jaw, and includes means for that purpose. This second member, referred to as the reference member herein, includes a reference mark on its lower edge which, when the second member is properly placed on the moveable jaw, indicates a measurement reading on the measuring leg which corresponds to the distance between the wrench's jaws.

It is an object of the present invention to provide an add-on accessory for an adjustable wrench which permits the wrench to function as a measuring device.

It is a further object of the present invention to provide a measuring accessory for an adjustable wrench wherein the accessory is very inexpensive, yet is accurate, durable, easy to apply, and very easy to read.

Yet another object of this invention is to provide a measuring accessory for an adjustable wrench which can be removed and repositioned as the wrench wears, or after it is damaged, in order to assure the continued accuracy of measurements taken therewith.

Yet a further object of the present invention is to provide an adjustable wrench with a measurement scale which is easy and inexpensive to replace if its indicia become illegible.

Still further objects of the inventive measuring accessory disclosed herein will be apparent from the drawings and following detailed description thereof.

DESCRIPTION OF THE PREFERRED EMBODIMENT

Figure 1:
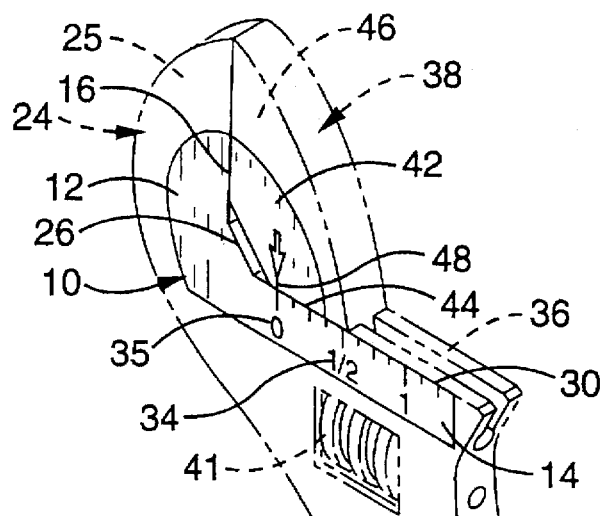
FIG. 1 is a perspective view of the L-shaped member and the reference member of the invention in place on the fully occluded fixed and moveable jaws, respectively, of an adjustable wrench.
Figure 2:
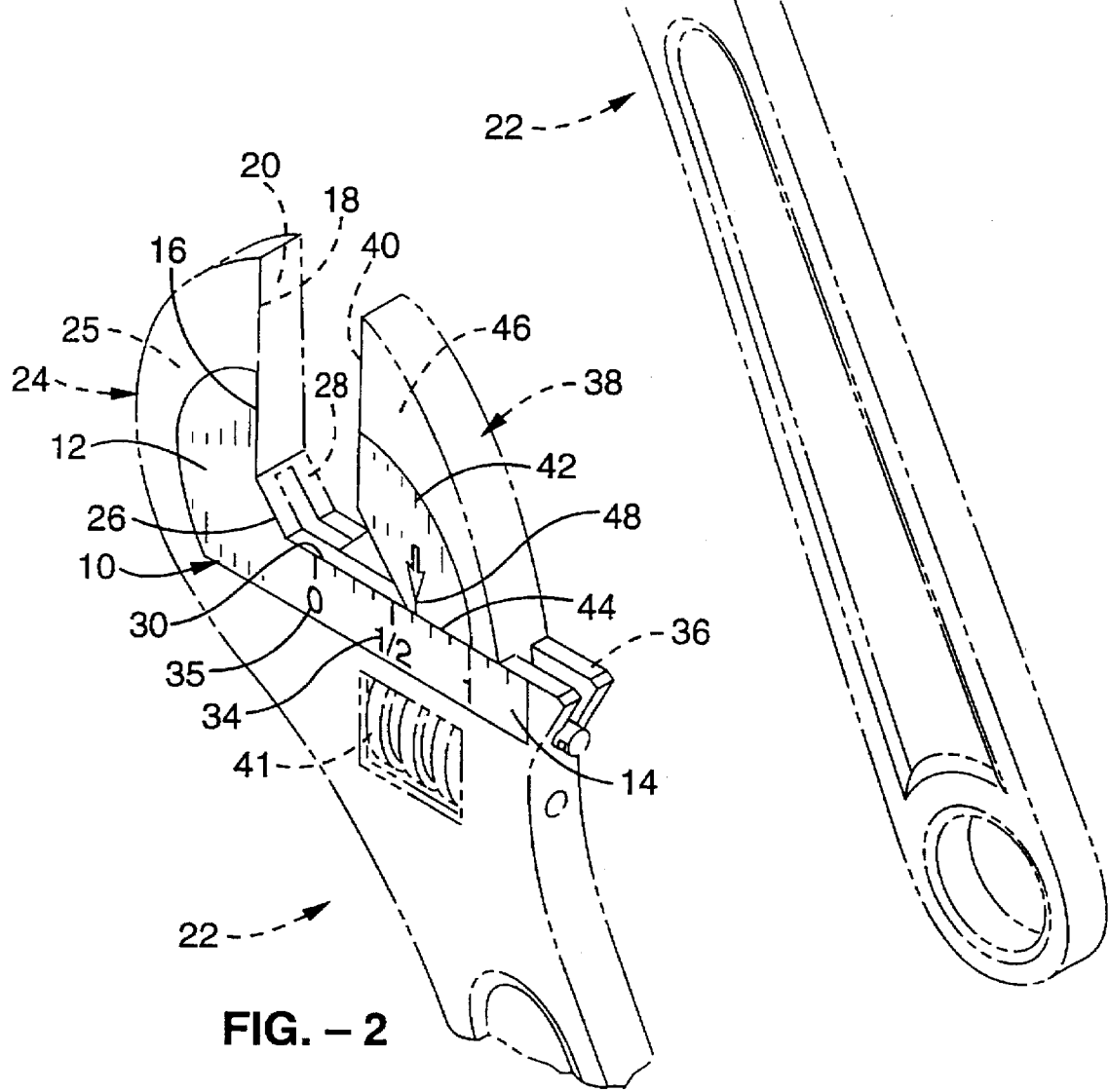
FIG. 2 is a perspective view of the adjustable wrench accessory of FIG. 1, showing the wrench's jaws in an open position with the moveable jaw portion's reference mark indicating the precise distance between the wrench's jaws.

Referring now specifically to the drawings, FIGS. 1 and 2 show the inventive measuring accessory, the primary, L-shaped member of which is generally identified herein with the reference numeral 10. L-shaped member 10 is constructed of thin, planar, durable material. L-shaped member 10 is also preferably flexible and adhesive-backed. Vinyl, polyester Mylar and other types of woven or non-woven plastic sheeting, thickly coated papers, composites, laminates and other compositions commonly used in the manufacture of the most durable, industrial quality labels and stickers are expected to work best in practicing the invention. But, the label stock chosen should fit the intended use. For example, labels having metallic surface components such as aluminum, or high-strength plastics such as Lexan, are expected to be most durable, while coated papers and the like may serve satisfactorily for other lighter-duty purposes. In some cases it may also be necessary or desirable to employ relatively rigid metallic or non-metallic stock in the construction of L-shaped member 10. Various surface finishes or colors may also be employed: for example, metallic silver may be aesthetically desirable for some purposes; high-visibility fluorescent colors such as bright orange or chartreuse might work best in very dirty environments; and, reflection-reducing flat black may be best where glare is a problem. And, other materials now known or later developed may work better, especially for highly-specialized purposes, or for use in certain environments.

L-shaped member 10 is comprised of first and second legs, the first leg being referred to herein as the base leg and identified herein with reference numeral 12, the second leg being referred to herein as the measuring leg and identified herein with reference numeral 14.

Base leg 12 is the shorter of L-shaped member 10's two legs, and includes positioning edge 16 which is straight and suited to being aligned closely with a side edge 18 of the workpiece-engaging face 20 of adjustable wrench 22's fixed jaw 24. Base leg 12's shape and dimensions are not critical; indeed, as noted below, base leg 12 is not a critical element to the invention's operation. However, if base leg 12 is included, straight edge 16 is a very useful element thereof. Despite its shape and dimensions not being critical, base leg 12 is preferably large enough that, when affixed to side face 25 of fixed jaw 24, base leg 12 stays durably in place during normal use of wrench 22 and, at the same time, provides a durable anchor for the thinner, elongate, measuring leg 14. But, at the same time, base leg 12 should be small enough to permit it to be moved around a bit on side face 25 for any needed adjustments of positioning edge 16 or measuring leg 14, without the periphery of base leg 12 projecting beyond the periphery of face 25 once straight edge 16 is placed as desired.

Base leg 12 may further include angular web 26 which follows the edge of fixed jaw 24's angled lower portion 28. Angular web 26 meets the upper, scale edge 30 of measuring leg 14. Upper, scale edge 30 is substantially perpendicular to positioning edge 16. Angular web 26 may be cut at a 45° angle between positioning edge 16 of base leg 12 and scale edge 30 of measuring leg 14; or, it may be cut at a different angle to match that of any specific style or brand of wrench for which a particular L-shaped member 10 may be specifically adapted. Indeed, angular web 26 is not a critical element, but it gives L-shaped member 10 more durability and better resistance to tearing between base leg 12 and measuring leg 14. Web 26 also gives L-shaped member 10 a more finished appearance, and creates the impression that L-shaped member 10 is an integral part of the tool to which it is applied.

Measuring leg 14 is elongate and includes length-indicating indicia comprised of a hatched scale 32 marked with numerals 34 indicating units of length. Scale 32 is comprised of a regularly-spaced series of short, hatched lines disposed in perpendicular orientation to scale edge 30, some or all of these lines being marked with length-indicating numerals 34.

Measuring leg 14 is of sufficient width to be durable, and to permit clear presentation of scale 32's hatching and length-indicating numerals 34. And, measuring leg 14 is preferably at least as long as the maximum working distance between the opposing faces 20 and 40 of jaws 24 and 38, respectively.

In some instances, length-indicating numerals may not be necessary on measuring leg 14. For example, longer lines may be used for whole numbers of length units, and shorter lines may be used to indicate fractions of units. In other instances such hatching may not be necessary, as where a length-indicating reference mark appears with each numeral. However, such arrangements are considered to fall within the invention.

Scale 32's hatched lines and numerals 34 may be printed on, or impressed, molded or engraved in or upon, measuring leg 14 in any manner or by any process commonly known in the art. The style, color, material and finish used in creating the indicia may be chosen for any particular intended purpose, e.g. for high-visibility, durability, legibility, or the like.

Numerals 34 preferably indicate units of distance, such as inches or centimeters, and fractions thereof, from a zero point 35 adjacent to where measuring leg 14 meets base leg 12. Fractions or decimal equivalents may be employed, as desired. Further, for some purposes, different types of numeric indicia may be employed. For example, scale 32 may be in braille.

It is also contemplated that a mirror-image pair of L-shaped members may be disposed upon opposing sides of a single adjustable wrench 22. By mirror-image, it is meant that when such L-shaped members are laid one atop the other so that their perimeters register, either their adhesive faces would be touching one another or their scaled faces would be touching one another. However, their indicia are not mirror-images of each other. If two such mirror-image, L-shaped members are employed, each member may bear a scale in different dimensional units, such as English units on one, and metric on the other. Likewise, different numerals may be displayed on each, such as arabic numerals on the one, and braille numerals on the other. As will become clear from the description of use of the invention further below, differently-scaled, mirror-image L-shaped units permit conversion between the dimensions or indicia of the two.

Measuring leg 14 is adapted to be affixed along the length of, and parallel to, track 36. That is, measuring leg 14 is oriented in the direction of travel of wrench 22's movable jaw 38 in track 36. Movable jaw 38 has a workpiece-engaging face 40 which opposes fixed jaw 24's workpiece-engaging face 20. Measuring leg 14 should be at least as long as the maximum working distance between the opposing faces 20 and 40 of wrench 22's fixed and movable jaws 24 and 38, respectively. Measuring leg 14's width is not critical, although it should be sufficiently wide that when affixed to that portion of wrench 22 along track 36, measuring leg 14 stays durably in place during normal use of wrench 22. But, at the same time, measuring leg 14 should be narrow enough to assure that it will not interfere with the workings of, and will not impair the user's operation of, wrench 22's worm gear 41.

In addition to L-shaped member 10, the preferred embodiment of the invention includes a second member, this second member being referred to herein as the reference member and identified with reference numeral 42. This supplemental reference member 42 is preferably constructed of the same thin, planar, flexible, durable, adhesive-backed material of which L-shaped member 10 is constructed. And, variations in the construction, finish and color of reference member 42 may be made for the same purposes as those recited with respect to L-shaped member 10, above.

The shape and dimensions of reference member 42 are not critical, but it is preferred that reference member 42 have at least one straight edge 44 which is adapted to align with that edge of movable jaw 38's side face 46 which is closest to track 36. As can be seen in FIGS. 1 and 2, straight edge 44 is disposed along the lower periphery of reference member 42.

Reference member 42 also includes indicia in the form of a reference mark 48 which, as shown herein, is an arrow with a precisely-drawn point, oriented in perpendicular relation to reference member 42's straight edge 44. Although an arrow shape is preferred, reference mark 48 may be of any configuration that identifies a precise point on straight edge 44.

Even though the shape and dimensions of reference member 42 are not critical, it is preferred that reference member 42 be large enough that, when affixed to side face 46 of movable jaw 38, member 42 stays durably in place during normal use of wrench 22. But, at the same time, reference member 42 should be small enough to permit it to be moved around a bit on side face 46, for example to set reference mark 48 adjacent zero point 35 on opposing scale 30, without the periphery of reference member 42 projecting beyond the periphery of face 46. Alternatively, if desired in a particular instance, reference mark may even be shaped as an arrow, or it may be of some other shape expedient for indicating a precise point along track 36. In that case, the reference member and reference mark could be one and the same element.

Considerations regarding the color, style and manner of creating reference mark 48 are similar to those set forth above with respect to scale 32's hatching, and numerals 34.

The adhesives which may be employed for affixing L-shaped member 10 and reference member 42 to surfaces of adjustable wrench 22, or to another tool, will depend upon the purposes desired. For example, if these members are to be securely and permanently affixed, those compounds generally referred to in the industry as "aggressive" permanent adhesives will be required. In contrast, when it is desirable that the members be removable, as where they are used on a tool which wears quickly or otherwise needs to be frequently recalibrated, or where the members may need to be moved from one tool to another, then either "repositionable" or "removable" adhesives may be required. Further, adhesives having a particular resistance to oil would be most preferred, both to assure secure initial affixation to wrenches having residual oil on their surfaces, and to assure secure continued affixation during use in oily environments.

It should also be understood that other means of affixing L-shaped member 10 and reference member 42 to wrench 22 are contemplated, and that these are considered to be within the scope of the invention. For example, mechanical fasteners such as screws, rivets, clips, or brackets, or other equivalent temporary or permanent affixation means, such as welds and the like, may be used to affix members 10 and 42 to wrench 22 in appropriate circumstances.

In use, L-shaped member 10 and reference member 42 are prepared for affixation to wrench 22 by exposing their back adhesive surfaces, such as by peeling off a covering sheet (not shown), or the like. Alternatively, adhesive may be applied to, or exposed upon, the back faces of members 10 and 42 by other means known in the art. The mounting surfaces of wrench 22, i.e. jaw side faces 24 and 46, and the side face (unnumbered) of track 36, should be as clean as possible before proceeding.

Then, L-shaped member 10 is applied to wrench 22 so that base leg 12's positioning edge 16 is aligned with and closely adjacent to fixed jaw 24's side edge 18. At the same time, elongate measuring leg 14 is aligned with and affixed to the face of track 36 such that scale edge 30 meets and follows track 36's elongate edge (unnumbered). Any excess length of measuring leg 14 may be trimmed off.

Next, with fixed jaw 24 and movable jaw 38 fully occluded as shown in FIG. 1, reference member 42 is applied to movable jaw 38's side face 46 such that reference member 42's straight edge 44 is aligned with and meets face 46's lower edge (unnumbered), and so that reference mark 48 registers precisely with zero point 35 on scale 32 of measuring leg 14.

L-shaped member 10 and reference member 42 may be applied to wrench 22 when it is new, by the manufacturer before sale, or by a purchaser after sale. Members 10 and 42 may also be applied to wrench 22 after wrench 22 has been in use for some time.

Figure 3:
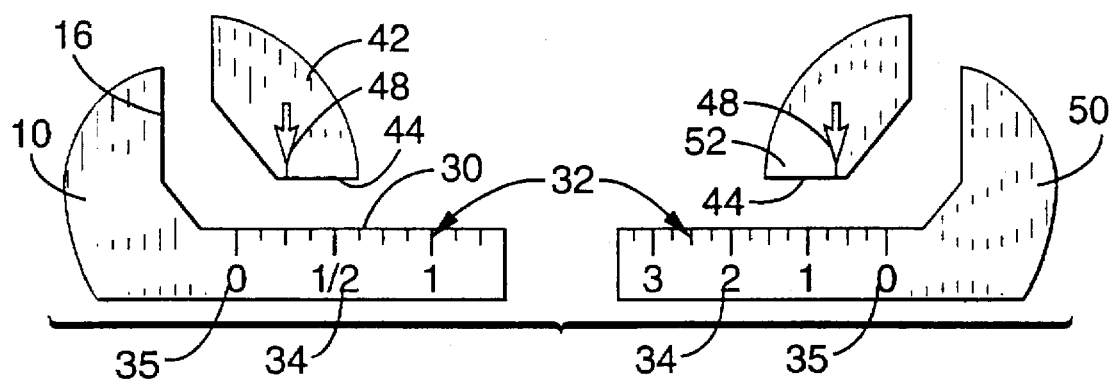
FIG. 3 is a plan view of a complete measuring accessory kit before affixation to an adjustable wrench, showing mirror-image L-shaped members, one bearing English measurement indicia, the other bearing metric, and also showing a pair of mirror-image reference members bearing reference marks for placement on opposite side faces of the wrench's moveable jaw.

For use after sale, L-shaped member 10 and reference member 42 may be offered as a kit for adding measuring capability to an existing wrench. Such a kit may, if desired, include two L-shaped members, as shown in FIG. 3. Therein, the first L-shaped member (as hereinbefore identified with reference numeral 10) has its measurement scale in English dimensional units, while the second L-shaped member (herein identified with reference numeral 50) has its measurement scale in metric (or other) units. Each L-shaped member also includes numerical indicia consistent with its own scale of measurement.

Note that L-shaped members 10 and 50 are mirror images of one another, each being adapted for affixation to only one of the two sides of wrench 22. Of course, it is not critical which L-shaped member has the English, metric or other scale of units, as the utility of being able to convert easily between the two would not be affected. Alternatively, if desired, both L-shaped members may be marked with the same scale of units if the ability to convert is not necessary.

Metric L-shaped member may also have a complementary reference member 52 which is a mirror image of reference member 42.

Once an L-shaped member 10 or 50 and a reference member 42 or 52 are in place on wrench 22, wrench 22 may be used for measuring the sizes of nuts and bolts and the like by first operating worm gear 41 to open jaws 24 and 38 so that the object being measured fits snugly between the opposing workpiece-engaging faces 20 and 40, thereof, respectively. Then, the distance between workpiece-engaging faces 20 and 40 (and, a fortiori, the width of the object being measured) is determined by reading the numeral 34 on scale 32 most closely adjacent to reference mark 48. This might be helpful, for example, where the user prefers to engage a particularly tight nut or bolt with a box end or socket wrench, and the user needs to know the correct size box end or socket to employ. Alternatively, if the correct size of the nut, bolt or other workpiece is already known, the distance between wrench 22's jaws may be set before the workpiece is engaged.

Further, if wrench 22 is accessorized with two L-shaped members 10 and 50 and corresponding reference members 42, the user can be certain that a measurement indicated by the position of a reference mark 48 adjacent one scale of units is a precisely-converted equivalent of the measurement indicated by the position of the other reference mark 48 adjacent the opposing scale. This conversion ability would permit a user to measure a nut or bolt sized in one scale of units, and would then enable the user to choose a box end or socket wrench sized in a different scale of units. Indeed, any adjustable wrench having this combination of two L-shaped members with different scales of units may also be used as an instrument for direct conversion between the two scales. For example, if a user needs to know the metric equivalent of a measurement in inches, or vice versa, the user simply turns wrench 22's worm gear until reference mark 48 is adjacent the point on the scale of units corresponding to the known measurement, and then the user finds the equivalent measurement adjacent opposing reference mark 48 on the scale of units on the other side of the wrench. Such direct conversion ability would also be useful, for example, for a sighted user's use in converting between braille and visually-perceptible indicia.

Of course, the inventive apparatus may also be used to measure a great variety of other items commonly used and encountered in carrying out construction, repair and maintenance in many fields of industry. Examples include diameters of wire and cable, as well as solid and tubular cylindrical items; and, thicknesses of many varieties of linear and planar stock.

Provided that an appropriate adhesive has been used, recalibration of wrench 22's measuring accessory is also possible. As necessary, as the faces of wrench 22's jaws wear, L-shaped member 10 and/or reference member 42 may be moved slightly on their respective side faces 25 and 46 to assure that reference mark 48 points to indicia on scale 32 indicating the precise distance between jaw faces 20 and 40.

As L-shaped member 10 and reference member 42 begin to wear or be damaged such that their indicia may no longer be legible, they may simply be replaced. That is, a new L-shaped member 10, and/or a reference member 42, may be applied to wrench 22 either after the respective old member has been removed, or alternatively, directly over the corresponding old member.

Further versatility is found in the invention in that, provided an appropriate adhesive has been used, L-shaped member 10 and/or reference member 42 may be moved from one adjustable wrench 22, to another.

It should also be understood that the invention is disclosed hereinabove in its preferred, most convenient to use form. However, in its essence, base leg 12 of L-shaped member 10 is not critical to the function of the invention, and nor is base leg 12 critical to many of the invention's advantages. And, neither are reference member 42 and reference mark 48 critical here. For example, without base leg 12, only a linear tape bearing hatched scale 32 and length-indicating numerals 34 would remain. But, providing that tape is properly positioned along track 36, and providing reference mark 48 of reference member 42 is adjacent the zero point 35 on scale 32, accuracy would be assured.

Figure 4:
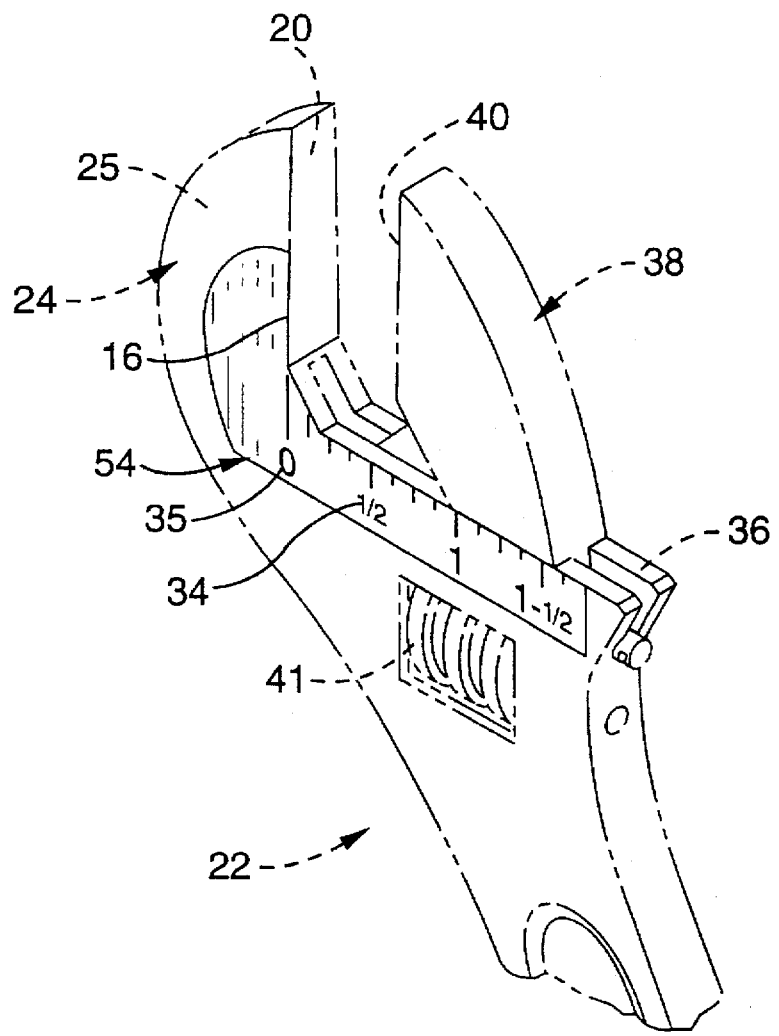
FIG. 4 is a perspective view of an alternative embodiment of the L-shaped member of the invention adapted for use without a cooperating reference mark-bearing reference member.

If reference member 42 and reference mark 48 are not employed, the workpiece-engaging face 40 of movable jaw 38 is simply used as a reference mark, instead. However, in that case, as shown in the alternative embodiment of L-shaped member 54 in FIG. 4, it is necessary to have scale 32's zero point 35 aligned precisely with positioning edge 16 and workpiece-engaging face 20 of fixed jaw 24.

Indeed, economizing even further, it becomes apparent that the essence of the function of the invention may be found in a single element comprised of a linear tape bearing a measurement scale, wherein the tape is positioned so that zero point 35 on the scale is aligned precisely with workpiece-engaging face 20 of fixed jaw 24. As above, the method of use requires that the workpiece-engaging face 40 of movable jaw 38 be employed as the reference mark.

The foregoing detailed disclosure of the inventive measuring accessory is considered as only illustrative of the preferred embodiment of, and not a limitation upon the scope of, the invention. Those skilled in the art will envision many other possible variations of the structure disclosed herein that nevertheless fall within the scope of the following claims. And, although many examples of such variations are set forth above, neither should these be considered to limit the invention.

Further, alternative uses for this inventive measuring accessory may later be realized. For example, if a vice or any other tool having occluding jaws has an appropriate surface between those jaws for mounting a member with scale 32 displayed thereupon, the essence of the invention may be practiced. Accordingly, the scope of the invention should be determined with reference to the appended claims, and not by the examples which have herein been given.

I claim:

1. An adjustable wrench able to be used as a measuring device, comprising the combination of:
   a. a handle;
   b. a pair of jaws, at least one of said jaws being movable with respect to the other;
   c. a track between said jaws;
   c. an elongate, planar member bearing length-indicating indicia, said member being adhesively bound to said track.

2. The wrench of claim 1, wherein one of said jaws is fixed to said handle, and wherein said elongate member includes a zero point aligned with a workpiece-engaging face of said fixed jaw.

3. The wrench of claim 1, wherein one of said jaws is fixed to said handle, and wherein a short, planar base leg, integral with and extending from said elongate member is adhesively bound to said wrench's fixed jaw.

4. The wrench of claim 1, wherein said elongate member is at least as long as a maximum working distance between opposing faces of said jaws.

5. The wrench of claim 1, further including a reference member adhesively bound to a movable jaw.

6. An accessory for enabling an adjustable wrench to function as a measuring device, comprising: a planar, adhesive-backed, L-shaped member having a short base leg and an integral elongate measuring leg, said elongate measuring leg bearing length-indicating indicia.

7. The accessory of claim 6, wherein said base leg and said measuring leg are at right angles to one another.

8. The accessory of claim 6 wherein an angle web is disposed between said base leg and said measuring leg.

9. A kit for enabling an adjustable wrench to function as a measuring device, wherein said adjustable wrench includes a handle, a jaw fixed to said handle, a track projecting from said fixed jaw, and a jaw movable in said track, the kit comprising:
   a. a first planar L-shaped member having a short base leg and an integral, elongate measuring leg, said elongate measuring leg bearing length-indicating indicia;
   b. means for affixing said L-shaped member to said adjustable wrench, such that said short base leg is disposed upon said fixed jaw, and such that said elongate base leg is disposed upon said track.

10. The kit of claim 9, wherein said affixing means comprises adhesive.

11. The kit of claim 9, further including a first reference member and means for affixing said reference member to said movable jaw.

12. The kit of claim 11, wherein said first reference member includes a reference mark.

13. The kit of claim 9, wherein said kit further comprises:
   a. a second L-shaped member having a short base leg and an integral, elongate measuring leg, said elongate measuring leg bearing length-indicating indicia, said second L-shaped member being a mirror-image of the first; and,
   b. means for affixing said second L-shaped member to said adjustable wrench, such that said short base leg is disposed upon a second side of said fixed jaw, and such that said elongate base leg is disposed upon a second side of said track.

14. The kit of claim 13, wherein said first L-shaped member and said second L-shaped member bear scales in different dimensional units.

15. The kit of claim 13, wherein said first L-shaped member and said second L-shaped member bear different numerical indicia.

16. The kit of claim 13, further including a second reference member and means for affixing said reference member to a second side of said movable jaw.

17. A kit for enabling an adjustable wrench to function as a measuring device, comprising:
   a. a first thin, planar, flexible, durable, adhesive-backed, L-shaped member having a short base leg and an integral, elongate measuring leg, said elongate measuring leg bearing length-indicating indicia; and,
   b. a first thin, planar, flexible, durable, adhesive-backed reference member bearing a reference mark.

18. The kit of claim 17, further including a second thin, planar, flexible, durable, adhesive-backed, L-shaped member, said second L-shaped member being a mirror image of the first L-shaped member, and having a short base leg and an integral, elongate measuring leg, said elongate measuring leg bearing length-indicating indicia.

19. The kit of claim 17, further including a second thin, planar, flexible, durable, adhesive-backed reference member bearing a reference mark.

* * * * *